United States Patent [19]

Kodaira

[11] 4,044,996
[45] Aug. 30, 1977

[54] VALVE MEANS

[76] Inventor: Heiichi Kodaira, Kitahara 3-2-18, Tanashi, Tokyo, Japan

[21] Appl. No.: 622,174

[22] Filed: Oct. 14, 1975

[30] Foreign Application Priority Data

Oct. 16, 1974 Japan .......................... 49-123910[U]
Nov. 5, 1974 Japan .......................... 49-132993[U]

[51] Int. Cl.² ........................................ F16K 31/524
[52] U.S. Cl. .................................... 251/229; 251/243; 251/251
[58] Field of Search ................... 137/624.17; 251/229, 251/236, 242, 243, 251, 335 A, 335 R; 74/18.1

[56] References Cited

U.S. PATENT DOCUMENTS

| | | | |
|---|---|---|---|
| 1,531,878 | 3/1925 | Reiter | 251/251 |
| 1,705,138 | 3/1929 | Rich | 251/229 |
| 2,185,394 | 1/1940 | Arbogast | 137/624.17 |
| 2,548,324 | 4/1951 | Smith | 137/624.17 |
| 2,659,364 | 11/1953 | Bruckmann | 137/624.17 |
| 3,211,416 | 10/1965 | Billeter et al. | 251/335 R |
| 3,246,872 | 4/1966 | Seltsam | 251/335 R |
| 3,303,852 | 2/1967 | Miller | 251/236 |
| 3,584,834 | 6/1971 | Reid et al. | 251/335 A |
| 3,613,518 | 10/1971 | Prosser | 74/18.1 |

FOREIGN PATENT DOCUMENTS 480,246  1/1952  Canada .............................. 251/251

*Primary Examiner*—Martin P. Schwadron
*Assistant Examiner*—G. L. Walton
*Attorney, Agent, or Firm*—Otto John Munz

[57] ABSTRACT

A valve means comprising a valve lever pivotably supported by a valve guide and having a valve disk at one end thereof, a flexible seal covering the supporting portion of the valve guide and supporting the valve lever, and a cam mechanism, said valve means being arranged to open and close the valve instantaneously by an extremely weak force by operating the valve lever by means of the cam mechanism.

8 Claims, 10 Drawing Figures

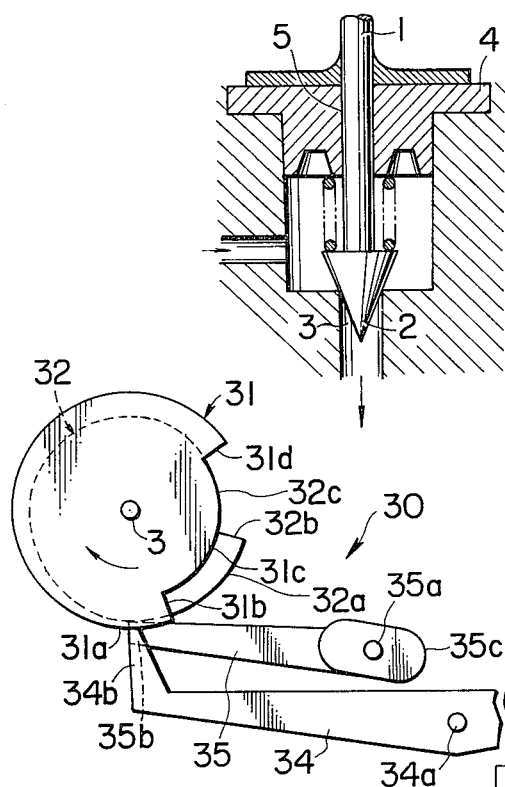
FIG. 1
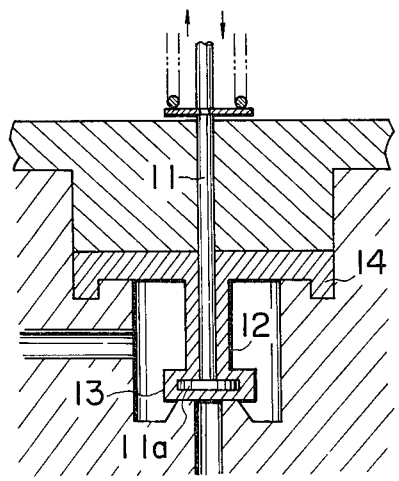
FIG. 2
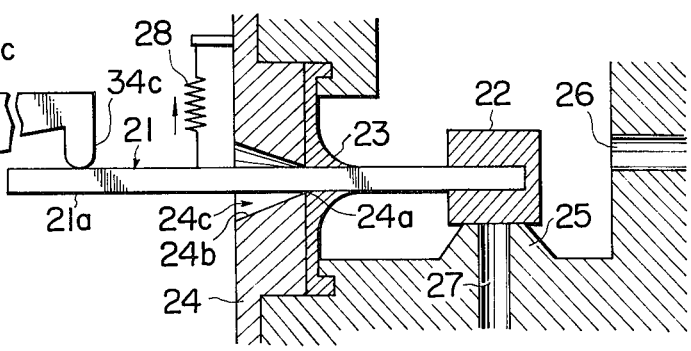
FIG. 3A
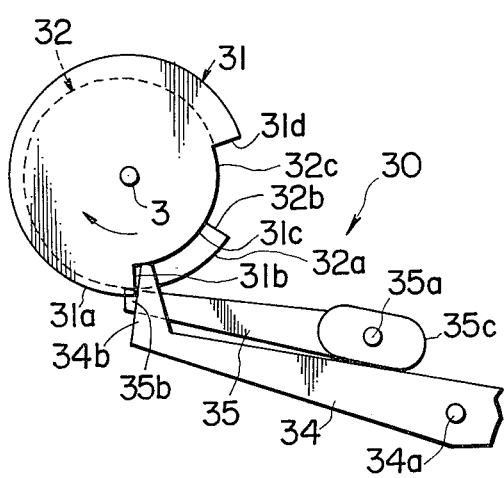
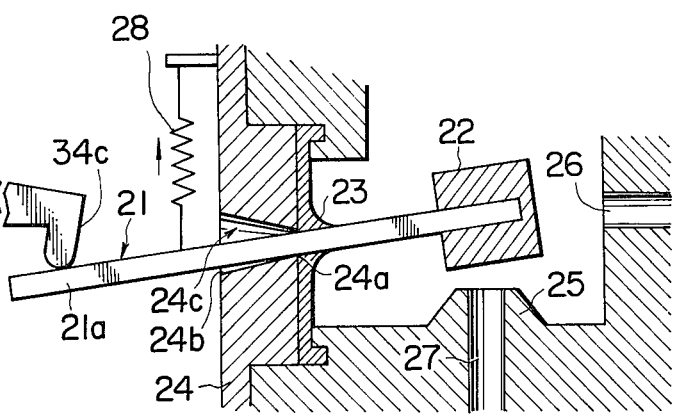
FIG. 3B

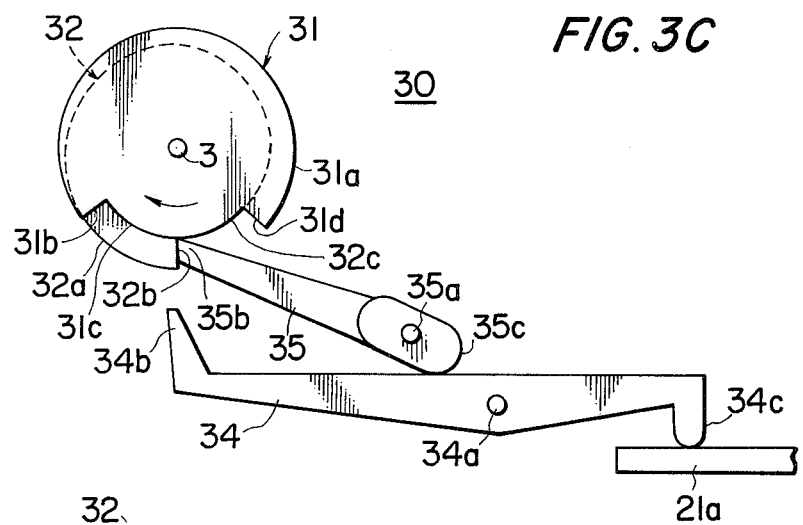
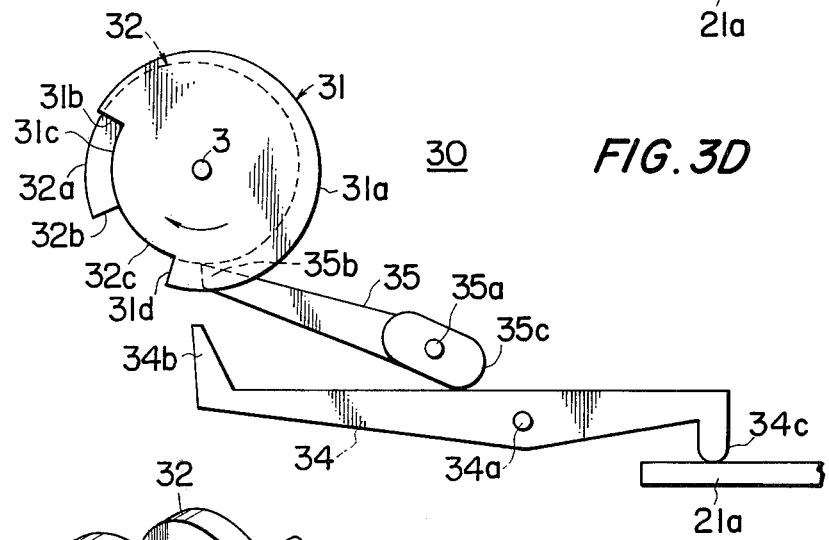
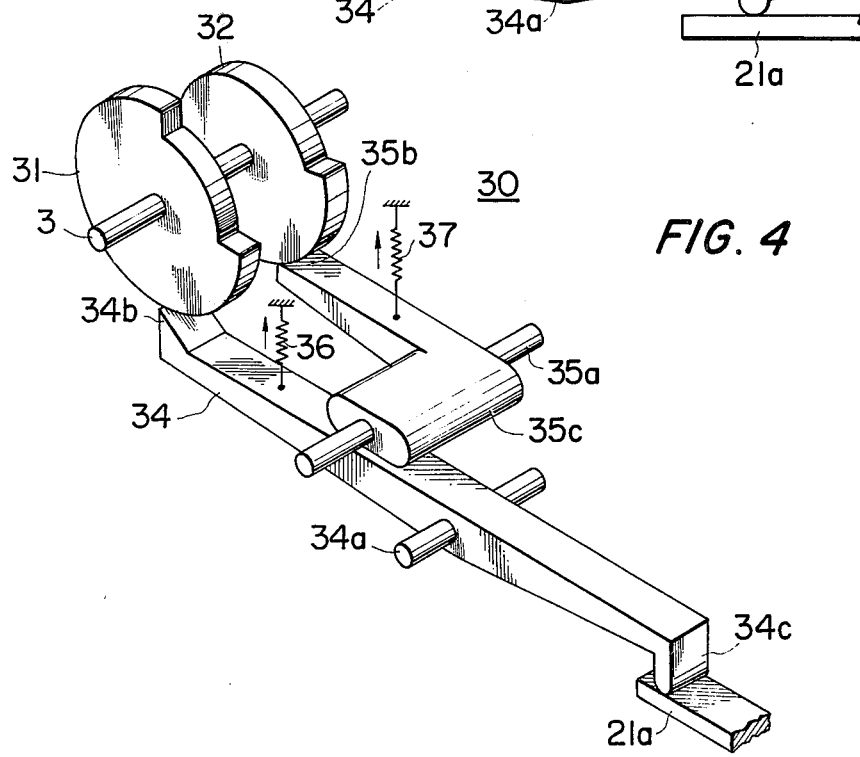

VALVE MEANS

BACKGROUND OF THE INVENTION a. Field of the Invention

The present invention relates to a valve means and, more particularly, to a valve means arranged to prevent leakage of fluid such as water, gas, etc. as far as possible and, at the same time, to be operated by an extremely weak force.

b. Description of the Prior Art

Known valve means are arranged, for example, as shown in FIG. 1 and are arranged to open and close a port 3 by moving a valve disk 2 upward and downward by moving a valve stem upward and downward.

The valve means shown in FIG. 1, however, has disadvantages as described below. That is, as the valve is opened and closed by moving the valve stem 1 upward and downward along a lip seal 4, leakage of fluid such as water, gas, etc. occurs at a sliding portion 5 between the lip seal and valve stem. When sealing of said sliding portion 5 is made perfect in order to prevent leakage of fluid, frictional resistance of the sliding portion becomes large and, consequently, it becomes difficult to smoothly move the valve stem upward and downward. Moreover, for said known means, the water pressure applied to the valve disk when closing the valve is large and, therefore, a large force is required to close it.

FIG. 2 shows another example of known valve means for which disadvantages of the valve means shown in FIG. 1 are eliminated to some extent. In this valve means, a cover 12 made of resilient material such as rubber is provided round the valve stem 11 and its end portion 13 is as a valve disk. Besides, said valve means comprises a seal portion 14 which is formed integrally with said cover 12. When the valve stem 11 is pulled upward to open the valve, the valve disk is moved upward by deforming the cover 12 by means of the end portion 11a of the valve stem 11, thus the valve opens. When the valve stem 11 is moved downward, the valve closes. In the valve means shown in FIG. 2, the valve stem 11, cover 13, valve disk 13 and seal portion 14 are formed integrally with each other. Therefore, perfect sealing effect is attained and leakage of fluid can be prevented completely. In case of this valve means, however, the relative movement of the valve stem 11 and cover 12 when opening and closing the valve is large and, moreover, said relative movement is achieved by deformation of the cover 12. Consequently, the cover 12 causes secular change. Therefore, this valve means cannot be used for a long period of time. Furthermore, in case of this valve means, the water pressure in the valve body is also large, and therefore, it is necessary to push the valve stem by a large force when closing the valve.

SUMMARY OF THE INVENTION

It is, therefore, a primary object of the present invention to provide a valve means comprising a valve lever pivotably supported by a valve guide and having a valve disk at one end, a seal covering the supporting portion of said valve guide and supporting said valve lever, and a cam mechanism for moving the other end of said valve lever upward and downward, said valve means being arranged to open and close the valve by an extremely weak force.

Another object of the present invention is to provide a valve means comprising a valve lever pivotably supported by a valve guide and having a valve disk at one end, a seal covering the supporting portion of said valve guide and supporting said valve lever, and a first and second cams provided for moving the other end of said valve lever upward and downward and rotatable integrally with each other, said first cam serving to open the valve, said second cam serving to close the valve, said valve means being arranged to open and close the valve by an extremely weak force.

BRIEF DESCRIPTION OF THE DRAWINGS

FIGS. 1 and 2 show sectional views showing known valve means;

FIGS. 3A through 3D respectively show sectional views illustrating the structure and operation of an embodiment of the valve means according to the present invention;

FIG. 4 shows a perspective view illustrating the cam mechanism employed for the valve means according to the present invention;

DETAILED DESCRIPTION OF THE PREFERRED EMBODIMENTS

Figure 5:
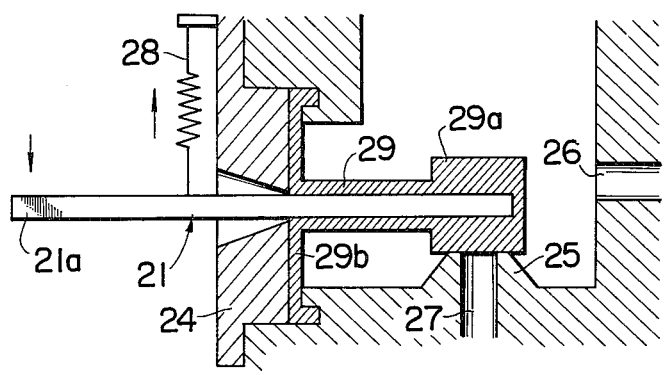
FIG. 5 shows a sectional view of another embodiment of the valve means according to the present invention.

FIGS. 3A through 3D show an embodiment of the present invention. In these figures, numeral 21 designates a flat valve lever, numeral 22 designates a valve disk provided at one end of the valve lever 21 and is made of flexible material such as rubber and numeral 23 designates a seal made of flexible material similar to the valve disk 22. Numeral 24 designates a valve guide made of material such as synthetic resin and having a hole 24c which is smallest at the inner portion 24a and becomes larger toward the outer portion 24b by opening upward and downward in the figure. The valve lever 21 is supported by the portion 24a of the hole 24c so that the lever 21 can be moved upward and downward by using the portion 24a as the fulcrum. Numeral 25 designates a valve seat, numeral 26 designates an inlet port, numeral 27 designates an outlet port (it is also all right to use the port 26 as the outlet and the port 27 as the inlet), and numeral 28 designates a spring. Numeral 30 designates a cam mechanism for operating the valve lever 21 constructed as shown in FIG. 4. Numeral 31 designates a first cam having a high portion 31a, step portions 31b and 31d and low portion 31c. Numeral 32 designates a second cam having a highest portion 32a, step portion 32b and lowest portion 32c, the circumference of the second cam 32 being formed as a curve for which the distance from the center of rotation of the second cam 32 varies gradually from the highest portion 32a toward the lowest portion 32c. Numeral 33 designates a cam shaft on which said first and second cams 31 and 32 are mounted and which is rotated by a suitable driving mechanism which is not shown. Numeral 34 designates a first lever rotatably supported by a shaft 34a. One end portion 34b of the first lever 34 is kept engaged with the first cam 31 by means of a spring 36 and the other end portion 34c is engaged with the end portion 21a of the valve lever 21. Numeral 35 designates a second lever rotatably supported by a shaft 35a. One end portion 35b of the second lever 35 is kept engaged with the second cam 32 by means of a spring 37. Besides, the second lever 35 has at its other end a protuberance 35c which projects toward a position above the first lever 34.

Operation of the valve means according to the present invention is as described below. When the first cam 31 and second cam 32 are in the position shown in FIG. 3A, the end portion 34b of the first lever 34 is engaged with the high portion 31a of the first cam 31 and the end portion 35b of the second lever 35 is also engaged with the high portion 32a of the second cam 32. Therefore, the other end portion 34c of the first lever 34 is kept horizontal or in the pushed-up state. Consequently, the valve lever 21 is in the state that its one end portion 21a is pulled up by means of the spring 28 and the valve disk 22 provided at the other end of the valve lever 21 is pushed down to keep the valve closed. When the cam shaft 33 is rotated to integrally rotate the first cam 31 and second cam 32 in the direction shown by the arrowhead and both cams come to the position shown in FIG. 3B, the low portion 31c of the first cam 31 comes to the position of the end portion 34b of the first lever 34. Therefore, the end portion 34b of the first lever 34 is pulled up by the force of the spring 6. Consequently, the other end portion 34c of the first lever is pushed down and pushes the end portion 21a of the valve lever 21 downward resisting against the force of the spring 28 and deforming the seal 23 made of flexible material. As a result, the valve disk at the other end of the valve lever 21 is pushed up to open the valve.

When both cams further rotate, the first cam 31 is still kept in the state that the low portion 31c is engaged with the end portion 34 of the first lever 34 as shown in FIG. 3C, which shows movement of the cams and levers only. On the other hand, for the second cam 32, the lowest portion 32c comes to the position of the end portion 35b of the second lever 35. Therefore, the end portion 35b of the second lever 35 is pulled up by the force of the spring 37, the other end of the second lever 35 is pushed down and the protuberance 35c pushes down the first lever 34 as shown in FIG. 3C. Consequently, the end portion 34c of the first lever 34 goes up. As a result, the end portion 21a of the valve lever 21, which was kept pushed down by the end portion 34c of the first lever 34, is pulled up by the force of the spring 28 and the valve closes again.

When both cams further rotate in the direction shown by the arrowhead, the other step portion 31d between the low portion and high portion of the first cam 31 approaches the end portion 34b of the first lever 34 as shown in FIG. 3D. As, however, the first lever is still kept pushed down by the second lever 35, the end portion 34b does not collide against the stop portion 31d of the first cam 31 and both cams keep on rotating smoothly. When both cams thus keep on rotating in the direction shown by the arrowhead, the end portion 35b of the second lever 35 is gradually pushed down by the second cam 32 and the protuberance 35c of the second lever 35 rotates in the direction to disengage from the first lever 34. Consequently, the end portion 34b of the first lever 34 gradually goes up. At that time, however, the step portion 31d of the first cam 31 already passed through the position of the end portion 34b of the first lever. Therefore, said end portion 34b engages with the high portion 31a of the first cam 31. In this state, both cams keep on rotating and the cam mechanism returns to the original state shown in FIG. 3A.

Furthermore, by adjusting the distance from the step portion 31b of the first cam 31 to the step portion 32b of the second cam 32, it is possible to adjust the operating time of the valve, i.e., the time for which the valve is kept opened.

FIG. 5 shows another embodiment of the valve means according to the present invention. This embodiment differs from the embodiment shown in FIG. 3A through FIG. 3D only in the following point. That is, in the embodiment shown in FIG. 5, the valve lever 21 is provided with a cover 29 of flexible material having a valve disk 29a and seal 29b formed integral with the cover 29. The other parts are constructed entirely same as those of the embodiment shown in FIG. 3A through FIG. 3D.

Figure 6:
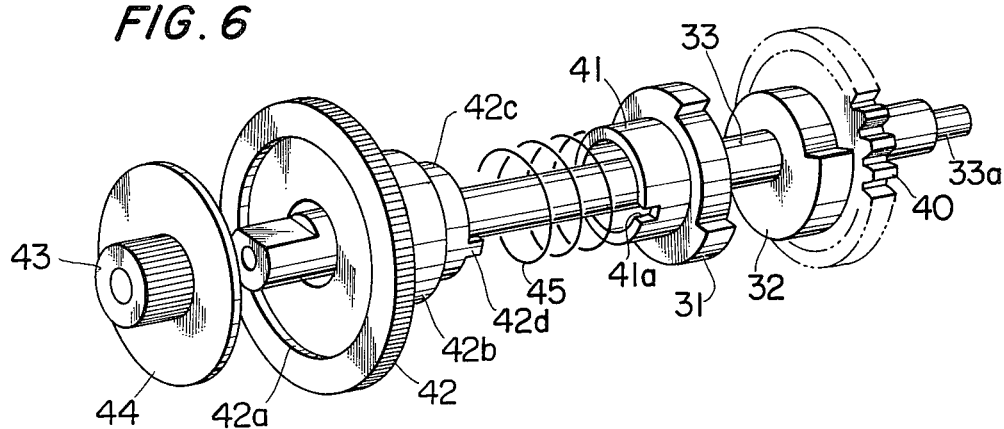
FIG. 6 shows an exploded perspective view of a cam mechanism comprising an operating-time adjusting mechanism.

FIG. 6 shows concrete construction of the cam mechanism for opening and closing the valve, out of the valve means according to the present invention, including an adjusting mechanism for the operating time of the valve. In FIG. 6, numerals 31, 32 and 33 respectively designate the first cam, second cam and cam shaft which are same as those shown in FIG. 4. Here, the first cam 31 is rotatably mounted to the cam shaft 33.

As the first lever, second lever, etc. are constructed in the same way as those shown in FIG. 4, they are omitted in FIG. 6. Numeral 40 designates a gear fixed to the cam shaft 33. The gear 40 is rotated by a timer which is not shown and rotates the cam shaft 33. Numeral 41 designates an annular member formed integral with the first cam 31 or integrally fixed to the first cam 31 and having a cut portion 41a as shown in FIG. 6. Numeral 42 designates a first handle rotatably mounted to the cam shaft 33. The first handle has a shallow circular concave portion 42a formed on one side face and has a stepped portions 42b and 42c formed on the other side face and a protuberance 42d which is fitted into the cut portion 41a of the annular member 41. Numeral 43 designates a second handle. Numeral 44 designates a disk member formed integral with said second handle 43 or integrally fixed to said second handle 43 by a suitable fixing means. The second handle 43 and disk member 44 are fixed to the shaft 33 by inserting the disk member 44 into the concave portion 42a of the first handle 42. Numeral 45 designates a spring provided between the first cam 31 and first handle 42 and positioned outside the annular member 41 and stepped portion 42c of the first handle 42. By the spring 45, the first cam 31 is always kept pushed against the second cam 32. The stepped portion 42b of the first handle 42 and end portion 33a of the cam shaft 33 are rotatably supported by suitable bearings.

In the cam mechanism as described in the above, the cam shaft 33 is rotated by the gear 40 when rotation of the timer is transmitted to the gear 40. Therefore, the second cam fixed to the cam shaft 33 is also rotated. As the first cam 31 is always kept pushed against the second cam 32 by the spring 45, both cams are integrally rotated and operates the valve lever 21 as described already.

Besides, when the first handle 42 is rotated by keeping the second handle 43 fixed, the annular member 41 is rotated because the protuberance 42d provided to the second handle 42 is fitted into the cut portion 41a of the annular member 41. As the annular member 41 is integral with the first cam 31, the first cam 31 also rotates in respect to the second cam and it is possible to change the relative position of both cams. By this change, it is possible to adjust the operating time of the valve.

Figure 7:
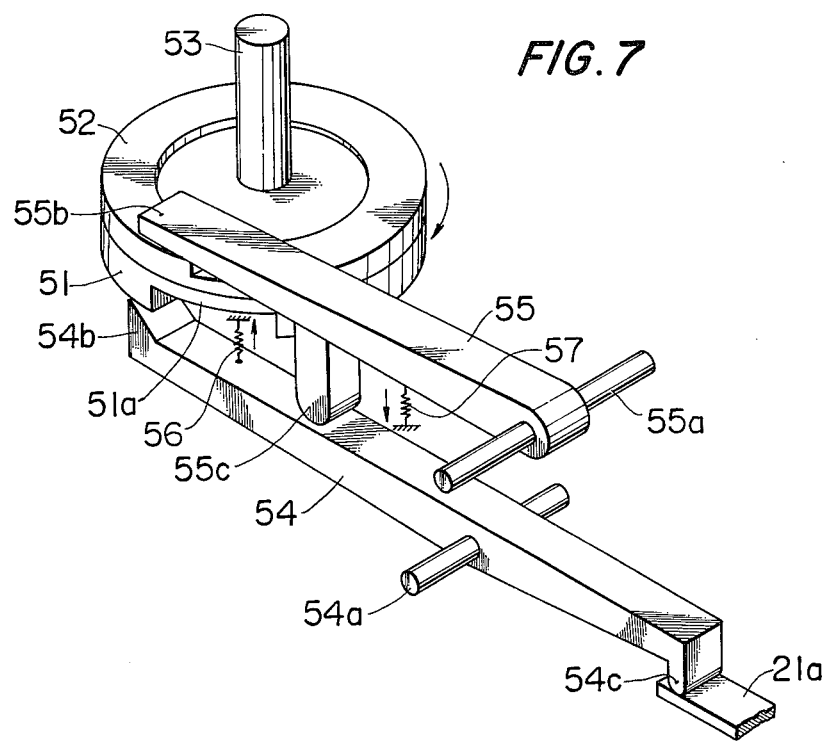
FIG. 7 shows a perspective view of another example of the cam mechanism.

FIG. 7 shows another example of the cam mechanism for opening and closing the valve in the valve means according to the present invention. The main difference of this example from the example shown in FIG. 4 etc. is that cam surfaces are formed on side faces of cams. As a result, arrangement and construction of levers also become slightly different from those shown in FIG. 4 etc. In FIG. 7, numerals 51 and 52 respectively designates a first and second cams. The first cam 51 has a low portion 51a of a suitable depth on its side face. The second cam 52 has, on its side face, a lowest portion, step portion and highest portion, said lowest portion and highest portion being connected by a continuous sloped surface of gentle gradient. These two cams are mounted to a cam shaft 53 as shown in FIG. 7. Numeral 54 designates a first lever rotatably supported by a shaft 54a and having one end portion 54b engaged with the cam surface of the first cam 51 and the other end portion 54c engaged with the valve lever 21. Numeral 55 designates a second lever rotatably supported by a shaft 55a and having one end portion 55b engaged with the cam surface of the second cam 52 and a protuberance 55c. The protuberance 55c of the second lever 55 is arranged so that its end portion will push the first lever 54 at its portion near the end portion 54b. Numerals 56 and 57 respectively designate springs which respectively pull the first lever 54 and second lever 55 in directions shown by respective arrowheads.

Operation of the above-mentioned cam mechanism is as follows. When the first cam 51 and second cam 52 are integrally rotated in the direction shown by the arrowhead by rotating the shaft 53 in the same way as the cam mechanism shown in FIG. 4, the end portion 54b of the first lever 54 engages with the low portion 51a of the first cam 51, the end portion 54b of the first lever 54 moves upward and the other end portion 54c of the first lever 54 moves downward. Therefore, the valve lever 21 is pushed down and the valve is opened. When both cams further rotate, the end portion 55b of the second lever 55 comes to the step portion of the second cam 52 and moves downward. As a result, the protuberance 55c of the second lever 55 pushes down the first lever 54, the end portion 54c of the first lever moves upward, the valve lever 21 also moves upward and the valve is closed. When both cams further rotate in the direction shown by the arrowhead, the end portion 54b of the first lever 54 engages with the high portion of the first cam 51, the end portion 55b of the second lever 55 is gradually pushed up by the gentle rising slope of the cam surface of the second cam 52 until it reaches the highest portion of the cam surface. Thus, the cam mechanism returns to the original state shown in FIG. 7.

Also in the case of the cam mechanism shown in FIG. 7, it is of course possible to adjust the operating time of the valve by varying the relative position of the first and second cams by a means similar to the adjusting mechanism described referring to FIG. 6.

The valve means according to the present invention described in the above is completely free from leakage of fluid such as water because the portion for supporting the valve lever 21 is perfectly sealed by the seal 23 made of flexible material. Moreover, the motion of the valve lever 21 is rotary motion and there is no sliding part. Therefore, the perfect sealing effect can be obtained by a simple seal. Besides, due to the fact that the motion of the valve lever is rotary motion and the fact that the water pressure applied to the top side of the valve disk 22 when the valve is opened is approximately equal to the water pressure applied to the bottom side, the valve can be closed by an extremely weak force applied to the valve lever 21.

I claim:
1. A valve means comprising:
    a valve lever pivotably supported by a valve guide and having a valve disk at one end thereof,
    a seal of flexible material sealing the supporting portion of said valve guide and supporting said valve lever;
    said seal being formed integral with said valve disk and covering a portion of said valve lever, and
    a cam mechanism comprising:
    a first cam having a cam surface of a high portion and low portion;
    a second cam rotatable integrally with said first cam and having
    a cam surface formed as a curved surface;
    the distance of said curved surface from the center of rotation of said second cam being varied gradually from the highest portion toward the lowest portion of said cam surface;
    a first lever pivotably supported by a shaft and biased so that one end thereof is pushed against said cam surface of said first cam, and
    a second lever pivotably supported by another shaft and biased so that one end thereof is pushed against said cam surface of said second cam;
    said valve means being arranged to integrally rotate both of said first and second cams so that said valve disk is opened when said one end of said first lever drops from said high portion to said low portion of said first cam as the other end of said first lever operates said valve lever and that said valve disk is closed when said one end of said second lever drops from said highest portion to said lowest portion of said second cam as said second lever pushes said first lever to return said first lever to the original position;
    said seal being deformed when said valve lever is operated.

2. A valve means according to claim 1, in which said cam mechanism is arranged to vary the relative position of said first and second cams in order to adjust the operating time of said valve disk.

3. A valve means according to claim 1, in which said first cam has a cam surface consisting of a high portion and low portion on its side face and said second cam has a cam surface also on its side surface, said cam surface of said second cam being formed as a sloped surface of gentle gradient from the lowest portion toward the highest portion of said cam surface.

4. A valve means according to claim 3, in which said cam mechanism is arranged to vary the relative position of said first and second cams in order to adjust the operating time of said valve disk.

5. A valve means comprising:
    a valve lever pivotably supported by a valve guide and having a valve disk at one end thereof,
    a seal of flexible material sealing the supporting portion of said valve guide and supporting said valve lever,
    said seal being deformed when said valve lever is operated, and
    a cam mechanism for operating said valve lever, comprising:

a first cam having a cam surface consisting of a high portion and low portion, a second cam rotatable integrally with said first cam and having a cam surface formed as a curved surface, the distance of said curved surface from the center of rotation of said second cam being varied gradually from the highest portion toward the lowest portion of said cam surface, a first lever pivotably supported by a shaft a biased so that one end thereof is pushed against said cam surface of said first cam, and a second lever pivotably supported by another shaft and biased so that one end thereof is pushed against said cam surface of said second cam, said valve means being arranged to integrally rotate both of said first and second cams, so that said valve disk is opened when said one end of said first lever drops from said high portion to said low portion of said first cam as the other end of said first lever operates said valve lever, and that said valve disk is closed when said one end of said second lever drops from said highest portion to said lowest portion of said second cam as said second lever pushes said first lever to return said first lever to the original position.

6. A valve means according to claim 5, in which said cam mechanism is arranged to vary the relative position of said first and second cams in order to adjust the operating time of said valve disk.

7. A valve means according to claim 5, in which said first cam has a cam surface consisting of a high portion and low portion on its side face and said second cam has a cam surface also on its side surface, said cam surface of said second cam being formed as a sloped surface of gentle gradient from the lowest portion toward the highest portion of said cam surface.

8. A valve means according to claim 7, in which said cam mechanism is arranged to vary the relative position of said first and second cams in order to adjust the operating time of said valve disk.

* * * * *